United States Patent [19]

Cyphelly

[11] Patent Number: 4,481,976
[45] Date of Patent: Nov. 13, 1984

[54] APPARATUS FOR PASSING A PRESSURE MEDIUM FROM A STATIONARY HOUSING TO A ROTATABLE SHAFT

[75] Inventor: Ivan J. Cyphelly, Hinteregg, Switzerland

[73] Assignee: Glyco-Antriebstechnik GmbH, Wiesbaden, Fed. Rep. of Germany

[21] Appl. No.: 360,319

[22] Filed: Mar. 22, 1982

[30] Foreign Application Priority Data

Mar. 30, 1981 [CH] Switzerland ............... 2147/81

[51] Int. Cl.³ ................................. F16L 27/00
[52] U.S. Cl. ........................... 137/580; 137/625.11
[58] Field of Search ............ 137/580, 625.11, 102; 192/85 A, 91 A, 106 F; 92/117 R

[56] References Cited

U.S. PATENT DOCUMENTS

| 235,565 | 12/1880 | Parsons et al. ............ 137/580 |
| 3,598,147 | 8/1971 | Kosaka .................... 137/580 |
| 3,772,966 | 11/1973 | Mills ..................... 92/117 R |
| 3,918,486 | 11/1975 | Cyphelly . | |
| 4,218,185 | 8/1980 | Trytek .................... 137/580 X |

FOREIGN PATENT DOCUMENTS 767910 2/1957 United Kingdom ............ 137/625.11

Primary Examiner—Martin P. Schwadron
Assistant Examiner—Stephen M. Hepperle
Attorney, Agent, or Firm—Browdy and Neimark

[57] ABSTRACT

The apparatus serves to pass an arbitrary pressure medium from a stationary housing (1) to a rotating shaft (4) provided with supply bores (3) in such a manner that there is little leakage or noise and the apparatus is ventable. Sliding pads (8) rest on a lateral contact face (12) of an indexing ring (13) rotating with the shaft (4) and axially displaceable thereon. The sliding pads (8) are supported in an axially displaceable manner on hollow pistons (7) secured to the housing (1). The indexing ring (13) has pins (19) for guiding and coupling it, which are supported in axial bores (21), provided with springs (22), of a shaft ring (16) secured on the shaft (4). The indexing ring (13) has axial check valves (23), each having a valve plug (25) whose end face (29) is located in the plane of the contact face (12) of the indexing ring (13) for the sliding pads (8). The valve chambers (30) of the check valves (23) are connected via bores (32) with discharge points in the other lateral face (14) of the indexing ring (13), opposite which are sealing faces (15) of the shaft ring (16) which communicate via bores (18) with the supply bores (3) of the shaft (4). In the pressurized state, the sliding pads (8) rest on the contact face (12) of the indexing ring (13), pressing it against the shaft ring (16) and carrying the pressure medium into the shaft (4). In the unpressurized state, the indexing ring (13) lifts up from the shaft ring (16) and ventilates the rotating parts. Because of the smoothness of the end faces (29) of the valve plugs (25) and of the contact face (12) of the indexing ring (13) for the sliding pads (8), there are no compression losses and thus no noise or leakage occurs.

12 Claims, 4 Drawing Figures

APPARATUS FOR PASSING A PRESSURE MEDIUM FROM A STATIONARY HOUSING TO A ROTATABLE SHAFT

FIELD OF THE INVENTION

The invention relates to an apparatus for passing a pressure medium from a stationary housing to a rotatable shaft provided with bores for supplying the pressure medium to a consumer. A ring surrounding the shaft rotates with the shaft and has a sealing face as a contact face for the sliding pads extending over part of the ring's circumference. Check valves distributed over the entire circumference of the ring, each having valve plates communicating on one side with discharge points in the sealing face and on the other with the supply bores in the shaft.

BACKGROUND OF THE INVENTION

Apparatus of this kind are known for use with incompressible media, for instance from U.S. Pat. No. 3,918,486. This U.S. patent also discloses that in such apparatus compression losses occur each time the flow course between the sealing face and each check valve is placed under pressure, specifically whenever the discharge point for a particular flow course, located in the sealing face, reaches the passage chamber defined by the sliding pad and by a portion of the sealing face. Among other effects, such compression losses cause significant noise emission. To aid in solving this problem, U.S. Pat. No. 3,918,486 has proposed to embody these flow courses as short as possible, and further to attain a storage of the pressure medium in the flow courses, because of centrifugal force, this latter feature being attained because the sliding pad rests on an inner jacket face of the ring rotating along with the shaft, so that the flow courses accordingly extend radially outward to the check valves.

However, these known apparatus, which make use of a centrifugal action exerted on liquid columns in order to reduce noise, cannot be used for compressible pressure mediums such as gases, and in particular compressed air. Furthermore, it is at least much more difficult to realize a ventable apparatus of the type described above using the known apparatus, if not in fact impossible, because as noted a radial contact face must be provided for the sliding pads in order to reduce compression losses, yet a ventable embodiment can be attained in engineering terms only if the sliding pads have an axial contact face. However, ventable apparatus for the passage of a pressure medium are often desirable, because they permit the pressure medium to escape from the chamber behind the check valves as soon as the pressure supply to the sliding pads has been interrupted.

SUMMARY OF THE INVENTION

It is accordingly a principal object of the present invention to create an apparatus of the general type described above, which can be used for both radial and axial sliding pad contacts, without compression losses, independently of the type of pressure medium being used.

This is attained in accordance with the present invention by embodying the valve plate of each check valve as a plug whose end face is located, in the plane of the sealing face for the sliding pads whenever the check valve is in its closing position.

When the check valves are embodied according to the invention, there is no flow course volume between the sealing face on which the sliding pads rest and the valve members of the check valves that is exposed to the change in pressure, so that leakage losses and noises do not occur. For this reason, when the sliding pad contact is axial, an indexing ring containing the check valves and rotating with the shaft on which it is axially displaceable can be exposed to the pressure medium via the sliding pads. The indexing ring establishes a sealed connection with a shaft ring, fixedly disposed on the shaft on the side of the indexing ring remote from the sliding pads and provided with passageway bores, only when there is a pressure buildup in the sliding pads. If there is a lack of pressure being exerted by the sliding pads, the indexing ring lifts from the shaft ring and thus permits the pressure medium stored in the rotating portion to escape.

In a preferred embodiment, each check valve has a cone seat discharging in the sealing face and a corresponding valve plug having a conical angle between 50° and 100°.

Exemplary embodiments of the present invention will be described below with the aid of the drawings.

DESCRIPTION OF THE PREFERRED EMBODIMENT

Figure 1:
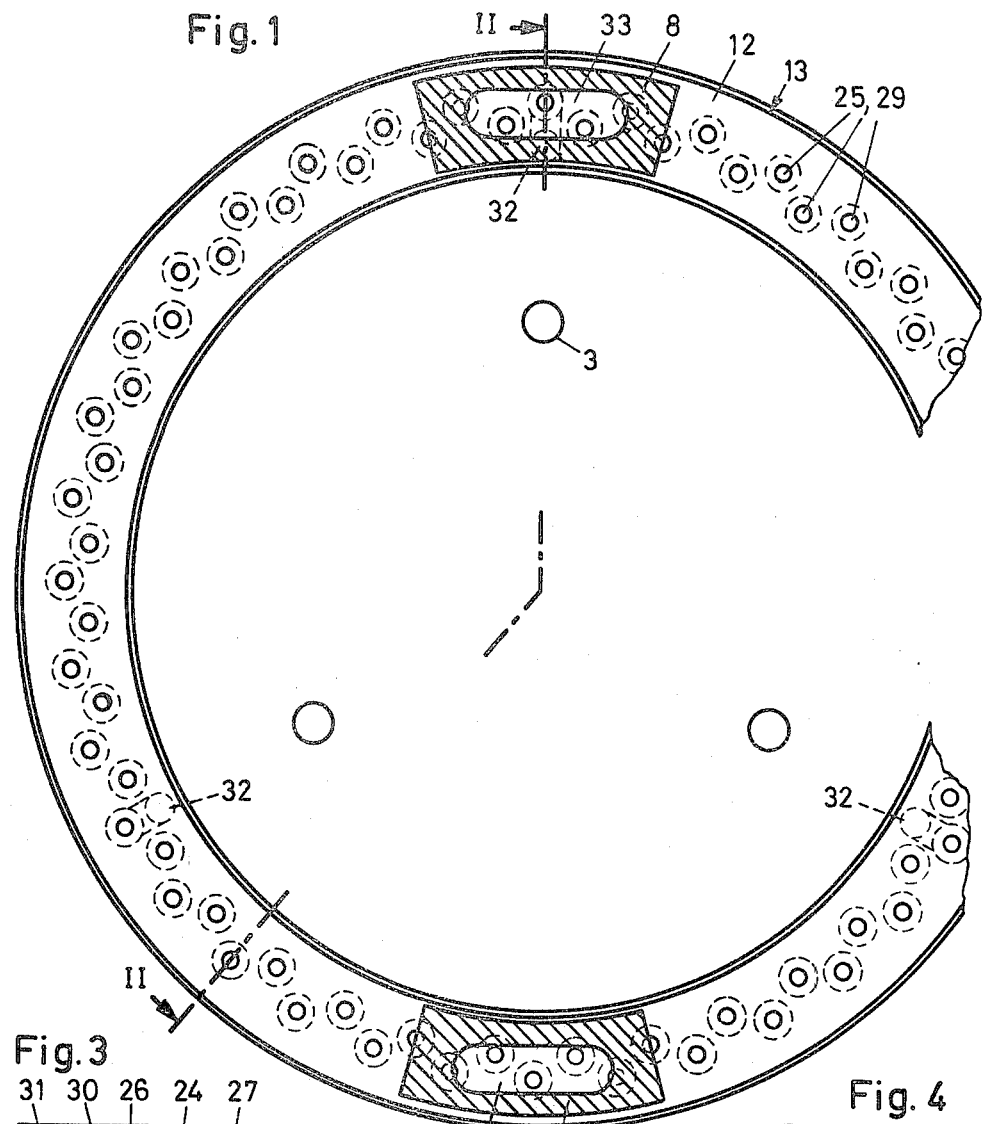
FIG. 1 is a plan view on the sealing face of an indexing ring of a ventable apparatus, seen in a radial section taken through the sliding pad resting on the sealing face along the line I—I of FIG. 2.
Figure 2:
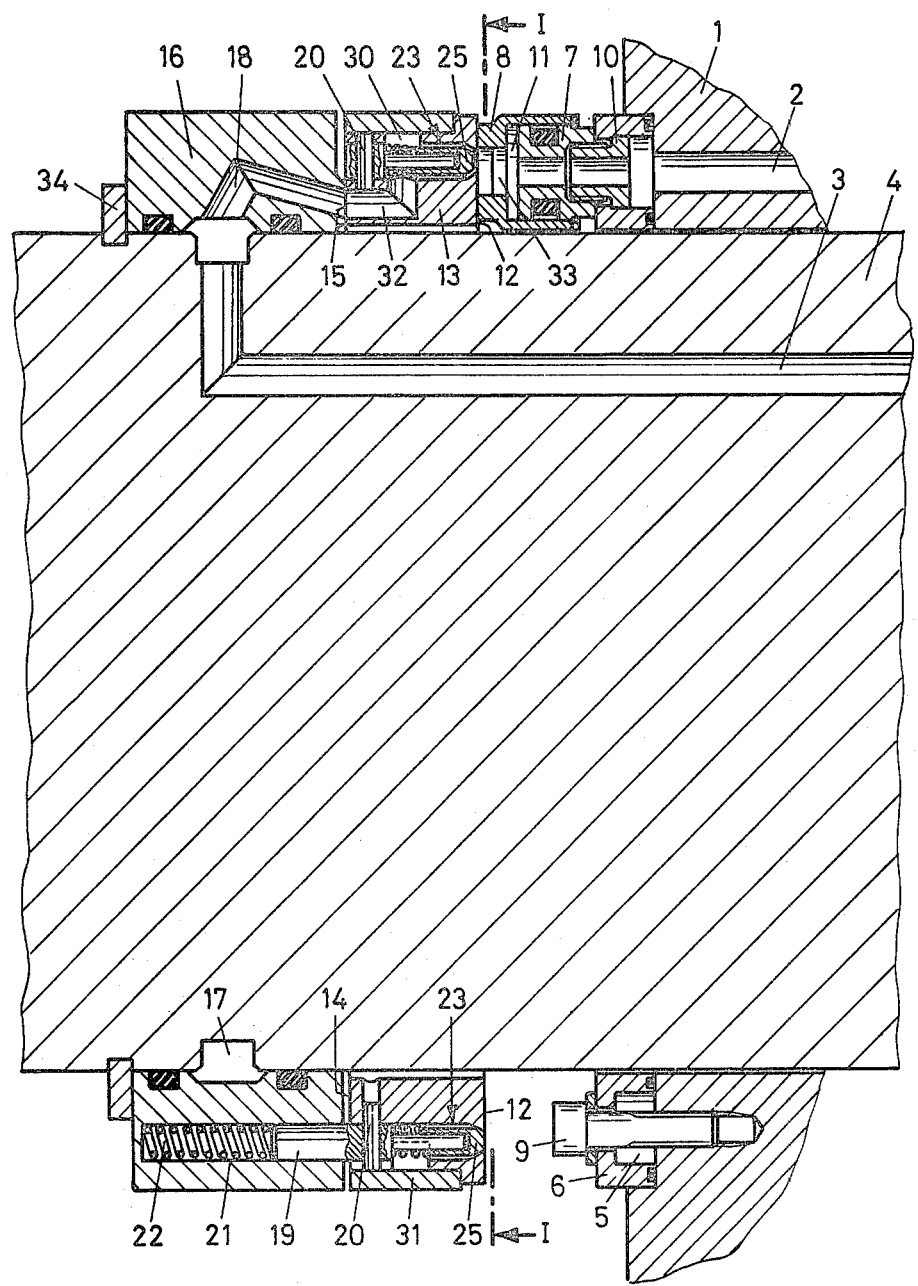
FIG. 2 is a section taken through the axis of the shaft of the apparatus along the line II—II of FIG. 1.

From a stationary housing portion 1 shown in FIG. 2, which is supplied with a pressure medium via a bore 2, the pressure medium is to be carried in bores 3 of a rotating shaft 4. A consumer, not shown but for instance a clutch actuatable by means of the pressure medium, is connected to the shaft bores 3. To this end, the housing portion 1 is provided with a distributor ring 6 containing a hollow chamber 5. Hollow pistons 7 are disposed at regular intervals on the circumference of the distributor ring and each carries a sliding pad 8 which is axially displaceable on the piston 7. In the present exemplary embodiment, as shown in FIG. 1, two such combinations of a piston 7 and a sliding pad 8 are provided, attached to the distributor ring 6 diametrically opposite one another. As shown in the lower part of FIG. 2, the distributor ring 6 is fastened to the housing portion 1 by means of screws 9. The hollow pistons 7, in turn, are fastened to the distributor ring 6 by means of hollow screws 10, so that the pressure medium can flow from the bore 2 via the hollow chamber 5 of the distributor ring 6 and through the bores in the screws 10 and the pistons 7 into the piston chamber 11 on the end face. The pressure of the pressure medium building up in the piston chamber 11 presses the sliding pads 8 against a lateral contact face 12 of an indexing ring 13 which will be described below. In order to reinforce this pressure, a spring (not shown) may be provided for each sliding pad 8 and disposed between the sliding pad 8 and the piston 7 or between the sliding pad 8 and the distributor ring 6 or the housing portion 1.

The indexing ring 13, which has the one lateral contact face 12 already noted, acting as a sealing face, is disposed axially displaceably on the shaft 4; whenever the sliding pads 8 are pressed by the pressure of the pressure medium against the contact face 12, the indexing ring 13 is pressed with its opposite lateral face 14 against sealing faces 15 of a shaft ring 16. The shaft ring 16 is disposed on the shaft 4 in a fixed manner. The shaft ring has an internal collector groove, which together with a corresponding external collector groove of the shaft 4 forms an annular collector conduit 17, with which both the bores 3 of the shaft 4 and bores 18 in the shaft ring 16 communicate, the bores 18 discharging into each of the sealing faces 15 of the shaft ring.

In order to guide the indexing ring 13 in an axial displacement along the shaft 4, in a position coaxial with the shaft 4, and simultaneously to rotate the indexing ring 13 with the shaft 4, guidance and coupling pins 19 are disposed in the indexing ring 13, distributed about its circumference, and are axially secured with set pins 20. The guidance and coupling pins 9 extend within corresponding bores 21 in the shaft ring 16, and a compression spring 22 is inserted into each bore 21. The springs 22 thus press the indexing ring 13 toward the right, as seen in FIG. 2, against the sliding pads 8.

As may be seen from FIGS. 1 and 2, axial check valves 23 are disposed at regular intervals over the circumference of the indexing ring 13 and offset from one another radially. Each check valve 23, as is seen particularly well in FIG. 3 on an enlarged scale, includes a valve pin 24, which carries a valve plug 25 capable of being axially displaced on the valve pin 24 and subject to the force of a compression spring 26 disposed on the valve pin 24. The valve pin 24 with the valve plug 25 is located in an axial bore 27 of the indexing ring 13, which discharges into the lateral contact face 12 of the indexing ring 13 and is embodied there as a cone seat 28 (see FIG. 3). The valve plug 25 has a corresponding conical shape and is embodied such that its end face 29 is located in the same plane as the contact face 12 in the closing state of the check valve, or in other words whenever the valve plug 25 is pressed against the valve seat 28 by the spring 26; this is shown in the lower part of FIG. 2. The conical angle of the valve seat 28 and the valve plug 25, for reasons having to do with manufacturing tolerances, amounts to between 50° and 100° and is preferably between 60° and 90°.

Figure 3:
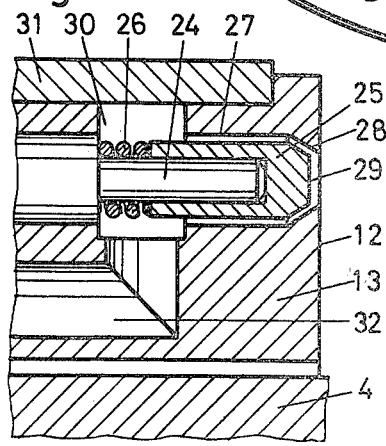
FIG. 3 is a section through a portion of a check valve as shown in FIG. 2, seen on an enlarged scale.

As seen in FIG. 3, a valve chamber 30 is provided which surrounds the area of the valve pins 24 carrying the spring 26. This valve chamber 30, taken at a whole, forms an annular collector chamber sealed off from the outside by a cover ring 31. At several locations—in the present exemplary embodiment as shown in FIG. 1, three locations—distributed over the circumference, connecting bores 32 lead from this collector chamber 30 to the lateral face 14 of the indexing ring 13, in which they discharge at the locations disposed opposite the discharge points of the bores 18 into the sealing faces 15 of the shaft ring 16.

The indexing ring 13 is provided with the guidance and coupling pins 19 as shown in the lower part of FIG. 2 at the locations of, or at a portion of the locations of, the check valves 23 located radially at the outside (FIG. 1). Here, the valve pin 24 is embodied as a stepped portion of the associated guidance and coupling pin 19.

For all the other check valves 23—that is, for all the check valves located radially toward the inside and for all the radially outside check valves at which there is no guidance and coupling pin 19 or connecting bores 32—the valve pin 24 is a part which is likewise axially secured by L set pin 20, as may be seen in the top part of FIG. 2. This set pin is not shown in FIG. 3.

As shown in FIG. 1, the sliding pads 8 take the shape of a plate-like segment of a circular annular element in the area in which they rest on the contact face 12 of the indexing ring. The circular-annular element has an elongated opening 33 which may be crescent-shaped and communicates with the piston chamber 11 as shown in FIG. 2. The opening 33 of each sliding pad 8 is of a size such that at least two radially offset valve plugs 25 are located in the vicinity of each opening 33.

In order to absorb the axial force exerted via the indexing ring 13 on the shaft ring 16, the shaft 4 is provided with a Seeger ring clip 34 (FIG. 2), against which the lateral face of the shaft ring 16 disposed opposite the sealing faces 15 presses.

The mode of operation of the illustrated apparatus is as follows: As already noted, when pressure medium is being supplied via the bore 2, the sliding pads 8 are pressed against the contact face 12 of the rotating indexing ring 13, which accordingly is displaced via the guidance and coupling pins 19 against the shaft ring 16, counter to the force of the springs 22, toward the left in FIG. 2, until the corresponding areas of its lateral face 14 rest on the three sealing faces 15 of the shaft ring 16. The various valve plugs 25 located in the vicinity of the openings 33 of the sliding pads 8 lift up from their seats 28, counter to the force of the springs 26, in response to the pressure exerted by the pressure medium, so that the pressure medium flows into the valve chambers 30 and via the connecting bores 32 and the contacting faces 14 and 15 into the bores 18 of the shaft ring 16. From there, the pressure medium flows via the collector conduit 17 into the bores 3 of the shaft 4 and thus to the consumer. The valve plugs 25 located outside the vicinity of the openings 33 of the sliding pads 8 are pressed by their springs 26 onto the valve seats 28, so that the pressure medium cannot escape.

The axial force exerted by the supplied pressure medium onto the indexing ring 13 via the sliding pads 8 disappears as soon as the supply of pressure medium to the sliding pads 8 is interrupted. The springs 22 in the bores 21 of the shaft ring 16 now press the indexing ring 13, together with the sliding pads 8, toward the right in FIG. 2, as a result of which a wide gap is opened between the sealing faces 15 of the shaft ring 16 and the lateral face 14 of the indexing ring 13; thus the pressure medium located in the rotating parts is able to escape.

The described embodiment of the check valves 23 with valve plugs 25 whose end faces 29, in the closing state of the check valves, are all located in the plane of the contact face 12 for the sliding pads 8, restricts the volume exposed to a pressure change during each passage of the sliding pad to the sealing gap between the flat areas of the sliding pad 8 and those of the contact face 12 of the indexing ring, thus practically preventing the occurrence of compression losses, with the leakage losses and nose emissions which they cause, no matter what type of pressure medium (gas, liquid) is used.

In order that the end faces 29 of the valve plugs 25 and the contact face 12 of the indexing ring 13 will be as smooth as possible, all these surfaces are preferably polished or lapped together, that is, after the check valves 23 have been incorporated in the indexing ring 13. In order to prevent the valve plugs 25 from lifting up from their valve seats 28, counter to the force of their springs 26, during this process as a consequence of the grinding pressure exerted on them, each check valve is advantageously subjected to pressure exerted on the side of its springs 26 during the polishing process.

The present embodiment of the check valves may also be put to use for apparatus in which the sliding pads rest on a cylindrical jacket face of a shaft ring connected with a rotating shaft; in other words, where there is a radial passage of the pressure medium from a stationary housing to a rotating shaft. A detail of such an apparatus is shown by way of example in FIG. 4.

A shaft ring 36 is secured on a rotating shaft 35. The shaft 35 is provided with a circumferential groove or collector groove 37, covered by the shaft ring 36, which communicates with bores (not shown) located in the shaft 35 and intended for supplying the pressure medium to a consumer. Opposite the collector groove 37, the shaft ring 36 has check valves 23' distributed uniformly over the circumference and having radial valve bores 38, one of which is shown in section in FIG. 4. The otherwise cylindrical bore 38 is embodied at its outer end, in the cylindrical jacket face 39 of the shaft ring 36 as a cone seat 40. A valve plug 41 is inserted into the bore 38 and is axially displaceable therein. The conical shape of this valve plug 41 corresponds to that of the cone seat 40, and its end face 42, in the illustrated closing state, forms a continuous cylindrical surface with the jacket face 39. The valve plug 41 is provided with an axial extension 43, which carries a bell-shaped ring 45 provided with bores 44; the ring 45 guides the valve plug 41 in the cylindrical portion of the bore 38. The collector groove 37 has a central rib 46, which restricts the axial movement of the valve plug 41 toward the interior and thus prevents it from falling out.

Figure 4:
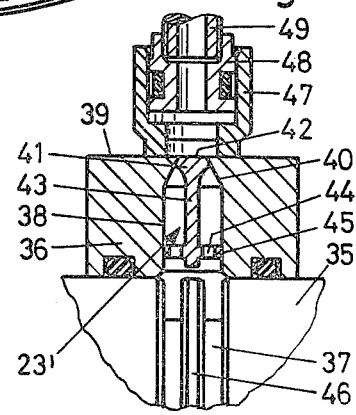
FIG. 4 is a section taken through the axis of the shaft of a portion of the form of embodiment of the apparatus having a radial contact for the sliding pad.

A plurality of sliding pads 47, by way of example two sliding pads, one of which is shown in station in FIG. 4, rest on the jacket face 39 of the shaft ring 36. The sliding pad 47, adapted to the cylindrical shape of the jacket face 39, is displaceably supported on a stationary hollow piston 48 and supplied with the pressure medium via a hollow fastening screw 49, in the same manner already described in connection with the sliding pad shown in FIG. 2. For this reason, details of the stationary housing portion and of the connecting parts connected with the piston 48 are not shown in FIG. 4.

The mode of operation of the sliding pad 47 and the check valve including the valve plugs 41 is identical to that of the exemplary embodiment shown in FIGS. 1-3. In contrast to the ventable embodiment of FIGS. 1-3 accomplished by means of a displaceable, rotating indexing ring, the radial arrangement of FIG. 4 does not, however, permit any return of the pressure medium. For this reason, the embodiment of FIG. 4 is not suited to such applications as exerting pressure on clutches and the like; on the other hand, it is well suited to use for adjustment actuations such as adjusting propellers and so forth. For such applications, the form of embodiment shown in FIG. 4 offers, in addition to the advantage of preventing compression losses without restriction to a particular pressure medium as discussed above, the further advantage of a particularly simple check valve structure, because as a result of the centrifugal force acting on the valve plugs when the shaft, and thus the shaft ring, are rotating, it is even possible to omit prestressing the valve plug by means of a spring.

It is to be understood that the foregoing text and drawing relate to an embodiment of the invention given by way of example but not limitation. Various other embodiments and variants are possible within the spirit and scope of the invention.

What is claimed is:

1. An apparatus for passing a pressure medium from a stationary housing provided with sliding pads to a rotatable shaft provided with bores for supplying the pressure medium to a consumer, the shaft being surrounded by a ring rotating with the shaft and the ring having a sealing face for the sliding pads extending over a portion of the circumference of the ring, to rest upon, the ring further having a plurality of check valves distributed over the entire circumference of the ring and each containing a valve plate, the check valves communicating on one side with discharge points located in the sealing face and on the other side with the supply bores in the shaft, the apparatus comprising:

the valve plate of each check valve (23; 23') being embodied as a plug (25; 41), having an end face (29; 42) located in the plane or the face of the sealing face (12; 39) for the sliding pads (8; 47) whenever the check valve (23; 23') is in its closing position, and means for ventilating the pressure medium stored behind the check valves when pressure exerted by the sliding pads on the rotating ring is interrupted.

2. An apparatus as defined by claim 1, wherein each check valve (23; 23') has a cone seat (28; 40) discharging into the sealing face (12; 39) and a corresponding valve plug (25; 41) with a conical angle between 50° and 100°.

3. An apparatus as defined by claim 1 or 2, wherein the check valves (23) disposed in sequence in the circumferential direction of the ring (13) are disposed offset relative to one another transverse to the circumferential direction, and the opening (33) of each sliding pad (8), embodied as a passageway chamber for the pressure medium, extends respectively over the end faces (29) of the valve plugs (25) of at least two check valves (23) offset relative to one another.

4. An apparatus as defined by claim 1, wherein each sliding pad (8; 47) is disposed in an axially movable manner on a piston (7; 48) secured on the housing (1) and provided with a bore (2) for supplying the pressure medium from the housing (1) to the sliding pad (8; 47), the piston (7; 48) forming together with the sliding pad (8; 47) a piston chamber (11) such that the sliding pad (8; 47) is pressed by the pressure medium against the sealing face (12; 39) of the ring (13; 36).

5. An apparatus as defined by claim 4, wherein each piston (7; 48) is attached by means of a hollow screw (10; 49) to a distributor ring (6) for the pressure medium secured to the housing (1).

6. An apparatus as defined by claim 1, in which the sealing face (39) is the cylindrical jacket face of a ring (36) attached in a fixed manner to the shaft (35), in which ring the check valves (23') are disposed in radial bores (38), wherein in each radial bore (38) has a valve seat (40) on its outer end which discharges into the sealing face (39) and on its inner end discharges into a collector groove (37) extending in the shaft (35) over its circumference, and that the valve plug (41) is disposed without a spring in the bore (38) and is guided in the cylindrical portion thereof, the collector groove (37) being provided with a central rib (46) for limiting the movement of the valve plug (41) in its opening direction.

7. In apparatus for passing a pressure medium from a stationary housing povided with sliding blocks to a rotatable shaft provided with bores for supplying the pressure medium to a consumer, the shaft being surrounded by a ring rotating with the shaft and the ring having a sealing face for the sliding blocks extending over a portion of the circumference of the ring, to rest upon, the ring further having a plurality of check valves distributed over the entire circumference of the ring and each containing a valve plate, the check valves communicating on one side with discharge points located in the sealing face and on the other side with the supply bores in the shaft, the sealing face (12) for the sliding pads (8) comprising one lateral face of said ring (13) rotating with the shaft (4), in which ring the check valves (23) are disposed in axial bores (27), the improvement comprising:

the valve plate of each check valve being embodied as a plug (25; 41), having an end face (29; 42) located in the plane or the face of the sealing face (12; 39) for the sliding blocks (8; 47) whenever the check valve (23; 23') is in its closing position, and said ring (13) is an indexing ring axially displaceable on the shaft (4), the second lateral face (14) of which indexing ring is embodied as a second sealing face, in which connecting bores (32) connecting the valve chambers (30) of the check valves (23) discharge, and that a second ring (16) is secured as a shaft ring on the shaft (4) adjacent to the second sealing face (14) of the indexing ring (13), the shaft ring (16) being provided with passageway bores (18) for the pressure medium are open toward the supply bores (3) of the shaft (4) and located on the lateral face (15) of the shaft ring (16), the lateral face (15) being oriented toward the indexing ring (13) and embodied as a sealing face, spring-loaded guidance and coupling devices (19) for the indexing ring (13) being disposed between the shaft ring (16) and the indexing ring (13) in such a way that the indexing ring (13), in the presence of a pressure exerted by the pressure medium, is pressed in a sealing and medium-passing manner against the shaft ring (16) by the sliding pads (8) and when pressure is lacking lifts up from the shaft ring (16), in order to ventilate the pressure medium stored in the rotating parts.

8. An apparatus as defined by claim 7, wherein the guidance and coupling devices (19) are axial pins anchored in the indexing ring (13), which are slidingly supported in axial bores (21) of the shaft ring (16) which are provided with compression springs (22), and that the respective valve plug (25) is disposed in a sliding manner and supported on a spring (26) within the indexing ring (13) on the end area of each pin (19).

9. An apparatus as defined by claim 7 or 8, wherein all the valve chambers (30) in the indexing ring (13) containing the valve plugs (25) form an annular collector chamber which discharges at locations distributed over the circumference into the second sealing face (14) via the connecting bores (32), the shaft ring (16) being provided at the corresponding locations on the circumference with the passageway bores (18), and that in the remaining circumferential areas the indexing ring (13) and the shaft ring (16) are provided at least in part with the guidance and coupling devices (19).

10. An apparatus as defined by claim 7, wherein on the side of the shaft ring (16) located opposite the sealing face (15) of the shaft ring, a support ring (34) for the shaft ring (16) is disposed on the shaft (4).

11. A method for producing the apparatus defined by claim 1, wherein the sealing face (12; 39) of the ring (13; 36) and the end faces (29; 42) of the valve plugs (25; 41) are simultaneously polished or lapped.

12. A method as defined by claim 11, wherein in the course of the polishing or lapping process the valve plugs (25; 41) are subjected to a pressure which presses them into their closing position.

* * * * *